3,466,179
PLASTICIZED SULFUR COMPOSITIONS
Carl C. Greco, Bronx, N.Y., assignor to Stauffer Chemical Company, New York, N.Y., a corporation of Delaware
No Drawing. Filed Aug. 17, 1967, Ser. No. 661,239
Int. Cl. C09d 5/00
U.S. Cl. 106—19
12 Claims

ABSTRACT OF THE DISCLOSURE

Impact resistant sulfur compositions comprising the reaction product of a major proportion of elemental sulfur and a minor amount of a bis(mercaptoalicyclic hydrocarbon)disulfide of the formula:

$$(HS)_nR\text{—}S_2\text{—}R'(SH)_{n'}$$

wherein R and R' are alicyclic hydrocarbons of from 3 to 12 carbon atoms and $n$ and $n'$ are integers of from 1 to 2, inclusive.

---

This invention relates to plasticized sulfur compositions and more particularly to compositions comprising a major proportion of sulfur plasticized with a bis(mercaptoalicyclic hydrocarbon)disulfide. The compositions are impact resistant and particularly well suited for use as road marking compositions.

Considerable research has been conducted on the utilization of sulfur compositions because of the inherent properties which such compositions exhibit. They are generally inexpensive and resistant to attack by acids, penetration by tree roots, as well as resistant to the action of lubricating oils or gasoline. Accordingly, such compositions have been found useful for jointing brick, sewer pipe segmental tile, and sewer brick. Sulfur compositions have also found use as road marking materials because of their inherent strength, flexibility and resiliency. Despite the considerable market potential for a successful plasticized road mark ing composition, suitable plasticizers have been mainly limited to the alkyl polysulfides such as polyethylene tetrasulfide.

It has now been discovered that certain bis(mercaptoalicyclic hydrocarbon)disulfides impart sufficient impact resistance to sulfur composition to permit the use of said sulfur compositions as road marking materials.

The bis(mercaptoalicyclic hydrocarbon)disulfide plasticizers of this invention can be represented by the formula:

$$(HS)_nR\text{—}S_2\text{—}R'(SH)_{n'}$$

wherein R and R' are alicyclic hydrocarbons of from 3 to 12 carbon atoms and $n$ and $n'$ are integers of from 1 to 2, inclusive. Examples of cycloaliphatic compounds include compounds of the above formula wherein R and R' are cyclopentyl, dimethylcyclopentyl, diethyl cyclopentyl, cyclohexyl, dimethylcyclohexyl, diethylcyclohexyl, 1,3-cyclooctyl, 1,5-cyclooctyl, and 1,5-cyclododecyl; or radicals of terpenes to include dipentene, bornylene, camphene, carene, fenchene, geranene, limonene, myrcene, ocimene, phellandrene pinene, sabinene, sylvestrene, terpinene and thujene.

The method of preparation for the plasticizers used in this invention is well known. For example, they can be prepared by first reacting an olefin with hydrogen sulfide at elevated temperature and pressure preferably under the exposure of ultra-violet radiation or in the presence of other catalysts; and then, oxidizing the mercaptan with a catalyst such as hydrogen peroxide at elevated temperature. For a complete discussion, see Reed Organic Chemistry of Bivalent Sulfur, volume 1, pages 19, 120–124, Chemical Publishing Company, Inc. (1958).

To prepare the novel impact resistant sulfur compositions, the above plasticizers are reacted with elemental sulfur in a plasticizer-sulfur weight ratio of from 1:99 to 1:1, and preferably from about 5:95 to 1:3. The reaction is preferably conducted in the presence of an alkaline material, such as calcium carbonate, which serves to catalyze the reaction. Only a small amount of alkaline material is used, generally less than 1.5% by weight of the final composition.

Other ingredients which can be incorporated in the impact resistant compositions, if desired, include fillers, dyes, pigments, etc. Although the order of addition is not critical, generally better dispersion can be obtained if the fillers, dyes and pigments and the like are dry-mixed prior to their addition to the plasticized sulfur. The plasticizer can either be combined with the elemental sulfur in the solid state or the plasticizer added to the sulfur in the liquid or molten state at a temperature of from about 118° C. to about 250° C.

Examples of fillers which can be added to tthe compositions include the sulfates, such as barium sulfate and calcium sulfate; silicas as exemplified by calcium silicate, magnesium silicate and silica; flours such as soya bean flour, tobacco flour, walnut shell flour and wood flour; and various clays such as kaolin clay, bentonite clay, ball clay and fire clay.

Examples of whiteners or pigments which can be blended with the compositions when they are employed for use as white marking materials include titanium dioxide and a mixture of zinc sulfide and barium sulfate known as lithopone. Yellow pigments are much more abundant and include the commercial pigments, such as Hansa yellow (the coupling product between diazotized p-nitroaniline and acetoacetanilide) and toluidine yellow (the coupling product between diazotized m-nitro-p-toluidine and acetoacetanilide).

In order to protect against bacterial attack that might result in deterioration and loss of bond to the pavement, a minor amount of a bactericide, such as o-benzyl-p-chlorophenol, pentachlorophenol, or sodium pentachlorophenate may be added to the melt but for most uses a bactericide is not required.

The sulfur composition is then applied in the molten state by any suitable applicator such as of the type used for applying paint which has been adapted to permit maintaining the sulfur composition in the molten state.

The following examples will serve to illustrate the invention. All parts and percentages in said examples are on a weight basis.

EXAMPLE 1

Preparation of bis(3-mercaptoisopropyl-2-methylcyclohexyl)disulfide

To a liter reaction flask at room temperature is added 60 grams (0.294 mole) of dipentene dimercaptan, 250 cc. of methanol and ½ cc. of concentrated hydrochloric acid. Seventeen grams, 0.15 mole, of 30 percent hydrogen peroxide is then added dropwise to the reaction flask, said addition being made at a rate sufficiently slow that the temperature of the exothermic reaction does not rise above 55° C. The hydrogen peroxide addition requires approximately fifty minutes to complete. The reaction mixture is then heated under reflux for one hour, at the end of which time there is noted the formation of two layers. The bottom or organic layer is removed and distilled under reduced pressure to recover 52 grams (90% yield) of bis(3-mercaptoisopropyl - 2 - methylcyclohexyl)disulfide having an analysis of 30.3% sulfur as compared to 31.4% sulfur, theoretical.

EXAMPLE 2

Preparation of bis(2-mercaptoethylcyclohexyl)disulfide

To a 1 liter reaction flask is added, at room temperature, 52.8 grams (0.3 mole) of ethylcyclohexyl dimercaptan, 250 cc. of methanol and 1 cc. of concentrated hydrochloric acid. Seventeen grams (0.15 mole) of 30% hydrogen peroxide is then added to the reaction flask at a rate sufficiently slow to maintain the temperature of the exothermic reaction below 55° C. The hydrogen peroxide addition requires approximately 30 minutes. The mixture is then heated under reflux for one hour, allowed to cool to room temperature and maintained at this temperature for approximately ten hours. The mixture separates into two layers, the bottom of which, the organic layer, is separated and distilled at reduced pressure to recover the product. Forty-six grams (89% yield) of bis(2-mercaptoethylcyclohexyl)disulfide is recovered having an analysis of 37.1% sulfur as compared to 36.6% sulfur theoretical.

EXAMPLE 3

Eighty parts of elemental sulfur in the molten state at a temperature of 150° C. is poured into a 250 cc. stainless steel beaker contained in a heating mantle. To this beaker is then added 20 parts of the compound of Example 1, and the mixture is heated to 150° C. and maintained at this temperature for 30 minutes. The mixture is poured into aluminum foil evaporating dishes approximately 2 inches in diameter and ½ inch high and allowed to cool to room temperature. The solid compositions are tested for impact resistance.

To test for impact resistance, two samples of the plasticized compositions are subjected to the Gardner light duty impact tester. This test consists of dropping a one pound ball on the sample from progressively higher heights until a cracking is noted on the reverse side of the sample. The two plasticized compositions are found to have an impact resistance of 6 inch-pounds. Two unplasticized sulfur compositions heated to 150° C. and maintained at this temperature for 30 minutes are also subjected to this test and found to have an impact resistance of less than 2 inch-pounds.

EXAMPLE 4

Eighty parts of elemental sulfur in the molten state at a temperature of 150° C. is poured into a 250 cc. stainless steel beaker contained in a heating mantle. To this beaker is added 20 parts of the compound of Example 2 and the mixture is heated to 150° C. and maintained at this temperature for 30 minutes. The mixture is poured into aluminum foil evaporating dishes approximately 2 inches in diameter and ½ inch high and allowed to cool to room temperature. The solid compositions are tested for impact strength and found to have an impact resistance of 6 inch-pounds.

EXAMPLES 5 THRU 10

In accordance with the procedure of Examples 1 and 2, the compounds of Table I are prepared which are shown with their reactants and solvents. They are all found to have an impact resistance of at least 6 inch-pounds when reacted with sulfur according to the procedue of Examples 3 and 4.

TABLE I

| Compound | Reactants | Solvent |
|---|---|---|
| Bis(mercaptodicyclopentyl)disulfide 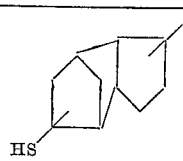 51 g. (85% yield) | 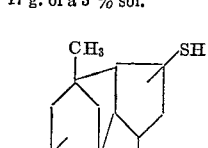 60 g. (0.3 mole) and H₂O₂ (5.1 g., .15 m.) 17 g. of a 3% sol. | 250 cc. of methanol and 1 cc. of conc. HCl |
| Bis(mercaptodimethyldicyclopentyl)disulfide 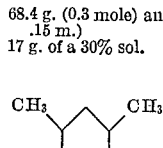 57 g. (82% yield) | 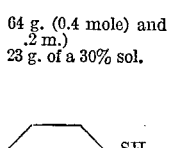 68.4 g. (0.3 mole) and H₂O₂ (5.1 g., .15 m.) 17 g. of a 30% sol. | Do. |
| Bis(mercaptodimethylcyclopentyl)disulfide (structure) 57.6 g. (90% yield) | (structure) 64 g. (0.4 mole) and H₂O₂ (6.8 g.; .2 m.) 23 g. of a 30% sol. | Do. |
| Bis(mercaptocyclooctyl)disulfide (structure) 51.2 g. (80% yield) | (structure) 64 g. (0.4 mole) and H₂O₂ (6.8 g.; .2 m.) 23 g. of a 30% sol. | Do. |

TABLE I—Continued

| Compound | Reactants | Solvent |
|---|---|---|
| Bis(mercaptocyclooctyl)disulfide 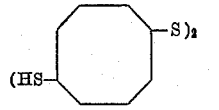 56.4 g. (88% yield) | 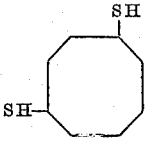 64 g. (0.4 mole) and H₂O₂ (6.8 g.; .2 m.) 23 g. of a 30% sol. | Do. |
| Bis(dimercaptocyclododecane)disulfide 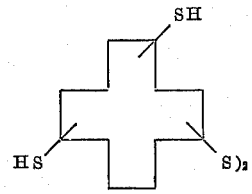 | 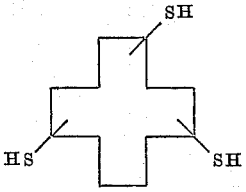 55.6 g. (0.24 m.) and H₂O₂ (4.2 g.; .12 m.) 14 g. of a 30% sol. | Do. |

EXAMPLES 11 THRU 15

For comparison purposes, structurally related compounds were reacted with sulfur and tested for impact resistance according to the procedure of Examples 3 and 4, and the structures and impact resistances are listed in Table II below.

TABLE II

| Plasticizer | Impact strength (inch-pounds) |
|---|---|
| 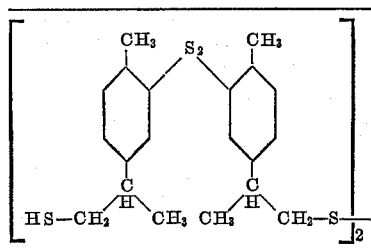 | 2 |
| 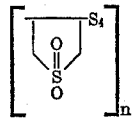 | 2 |
| 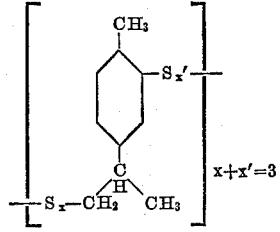 | 2 |
| 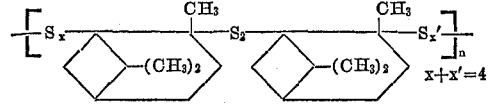 x+x'=4 | 2 |
| 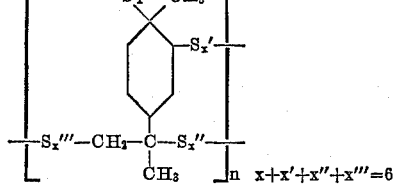 x+x'+x''+x'''=6 | 2 | wherein n is an integer of one or greater.

What is claimed is:
1. An impact resistant sulfur composition comprising the reaction product of a major proportion of elemental sulfur and a minor amount of a bis(mercaptoalicyclic hydrocarbon)disulfide of the formula:

$$(HS)_nR-S_2-R'(SH)_{n'}$$

wherein R and R' are alicyclic hydrocarbons of from 3 to 12 carbon atoms and n and n' are integers of from 1 to 2, inclusive, said reaction is conducted at 118° C. to about 250° C.

2. The composition of claim 1 wherein the weight ratio of elemental sulfur to disulfide is from 99 to 1 to 1 to 1.
3. The composition of claim 1 wherein the weight ratio of elemental sulfur to disulfide is from 95 to 5 to 3 to 1.
4. The composition of claim 1 wherein the disulfide is bis(3-mercaptoisopropyl-2-methylcyclohexyl)disulfide.
5. The composition of claim 1 wherein the disulfide is bis(2-mercaptoethylcyclohexyl)disulfide.
6. The composition of claim 1 wherein the disulfide is bis(mercaptodicyclopentyl)disulfide.
7. The composition of claim 1 wherein the disulfide is bis(mercaptodimethyldicyclopentyl)disulfide.
8. The composition of claim 1 wherein the disulfide is bis(mercaptocyclopentyl)disulfide.
9. The composition of claim 1 wherein the disulfide is bis(mercaptocyclooctyl)disulfide.
10. The composition of claim 1 wherein the disulfide is bis(mercaptocyclooctyl)disulfide.
11. The composition of claim 1 wherein the disulfide is bis(dimercaptocyclododecane)disulfide.
12. A process for preparing impact resistant sulfur compositions which comprises reacting a major amount of elemental sulfur and a minor amount of bis(mercaptoalicyclic hydrocarbon)disulfide of the formula:

$$(HS)_nR-S_2-R'(SH)_{n'}$$

wherein R and R' are alicyclic hydrocarbons of from 3 to 12 carbon atoms and n and n' are integers of from 1 to 2, inclusive, wherein the reaction is conducted at a temperature of from about 118° C. to about 250° C.

References Cited

UNITED STATES PATENTS

| 3,342,620 | 9/1967 | Molinet | 106—287 |
| 2,237,625 | 4/1941 | Olin | 260—125 |

JULIUS FROME, Primary Examiner

T. MORRIS, Assistant Examiner

U.S. Cl. X.R.

94—1.5; 106—70, 287